(12) United States Patent  
Kelly et al.

(10) Patent No.: US 7,875,135 B2
(45) Date of Patent: Jan. 25, 2011

(54) HIGH PRESSURE TURBINE AIRFOIL RECOVERY DEVICE AND METHOD OF HEAT TREATMENT

(75) Inventors: Thomas J. Kelly, Cincinnati, OH (US); Warren D. Grossklaus, West Chester, OH (US); Brent R. Tholke, Cincinnati, OH (US); Christine Govern Walston, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/546,378

(22) Filed: Aug. 24, 2009

(65) Prior Publication Data
US 2009/0314393 A1    Dec. 24, 2009

(51) Int. Cl.
C21D 1/10    (2006.01)
C22F 1/10    (2006.01)
(52) U.S. Cl. .................................. 148/641; 148/639
(58) Field of Classification Search ............... 148/639, 148/640, 641
See application file for complete search history.

(56) References Cited

U.S. PATENT DOCUMENTS 3,833,207 A * 9/1974 Allen et al. ............... 266/260
4,818,833 A    4/1989 Formanack et al.
5,527,020 A    6/1996 Ganesh et al.
5,794,338 A    8/1998 Bowden, Jr. et al.
5,822,852 A    10/1998 Bewlay et al.
5,913,555 A    6/1999 Richter et al.
6,020,571 A    2/2000 Grossklaus, Jr. et al.
6,118,098 A    9/2000 Amos et al.
6,124,568 A    9/2000 Broderick et al.
6,333,484 B1    12/2001 Foster et al.
6,359,267 B1    3/2002 Wilcox et al.
6,502,304 B2    1/2003 Rigney et al.
6,531,005 B1    3/2003 Bezerra et al.
6,660,110 B1    12/2003 Gayda et al.
6,755,924 B2    6/2004 Harrison et al.
6,811,379 B2    11/2004 Fernihough et al.
6,908,288 B2    6/2005 Jackson et al.

FOREIGN PATENT DOCUMENTS

GB    2315697 A    2/1998

* cited by examiner

*Primary Examiner*—Scott Kastler
(74) *Attorney, Agent, or Firm*—McNees Wallace & Nurick LLC

(57) ABSTRACT

Provided is a method for heat treating a precipitation-hardened article having a thick section and a thin section so that the thin section can be solution annealed while the metallurgical structure of the thick section is substantially unaffected by the solution-annealing process. The method restores the microstructure of the thin section uniformly by solution annealing the thin section to achieve a preselected microstructure but without affecting the microstructure of the thick section.

12 Claims, 5 Drawing Sheets

HIGH PRESSURE TURBINE AIRFOIL RECOVERY DEVICE AND METHOD OF HEAT TREATMENT

CROSS-REFERENCE TO RELATED APPLICATIONS

This application claims the benefit of U.S. application Ser. No. 11/383,783, filed May 17, 2006, now abandoned which is incorporated by reference in its entirety.

FIELD OF THE INVENTION

The present invention is directed to a method for solutioning a portion of the airfoil followed by aging the solutioned airfoil

BACKGROUND OF THE INVENTION

An aircraft gas turbine engine or jet engine draws in and compresses air with an axial flow compressor, mixes the compressed air with fuel, burns the mixture, and expels the combustion product through an axial flow turbine section that powers the compressor. The turbine section of the engine includes one or more disks, each disk including a plurality of blades projecting from its periphery. The hot exhaust gases strike the blades causing the disk(s) to rotate. The rotating disk(s) are attached to a shaft that also drives a compressor. The compressor is also made from rotating disks, each disk having a plurality of blades projecting from its periphery. The disk turns rapidly on a shaft as the shaft is rotated by the turbine, and the curved blades draw in and compress air in somewhat the same manner as an electric fan.

The turbine blades on the disk are in the hot exhaust gases resulting from the combustion of the fuel and rotate at very high speeds. Thus the blades operate in an oxidative and corrosive environment, and are subjected to high operating stresses. In order to survive these harsh conditions, the turbine blades are made from superalloys, an expensive blend of elements that provide oxidation resistance, corrosion resistance and strength. These superalloys are further strengthened in preferred directions by various mechanisms which include growing the turbine blades as directional grains or even as single crystals.

The superalloys used for turbine blades include nickel-based superalloys, iron-based superalloys and cobalt-based superalloys. These superalloys can be further strengthened by precipitation mechanisms. For example, gamma prime ($\gamma'$) phases comprising $Ni_3Al$ are precipitated in the gamma matrix of the FCC crystal structure of the alloy by appropriate solutioning and aging treatments. Controlling the gamma prime phases, both the size and distribution for these as-cast, new parts is well-known. The turbine blade comprises an airfoil portion that extends into a hot gas stream, a dovetail portion that attaches the blade to the turbine disk and optionally a platform portion that separates the airfoil portion from the dovetail portion. A shank portion is intermediate the platform portion and the dovetail portion. The turbine blades are also provided with environmental coatings and/or thermal barrier coatings to further improve their survivability in the hot, corrosive, oxidative environment of a turbine engine.

The turbine blades nevertheless are subject to damage as a result of operation in the gas turbine engine. This damage can be both mechanical in nature as well as metallurgical in nature. The turbine blades are expensive to produce, so that it is desirable from an economic standpoint to repair the blades rather than replace them whenever possible. In many situations, the blades can be repaired by removing any remaining protective coatings, followed by welding damaged mechanical areas and reworking the weld repaired areas to restore the dimensions as required, followed by reapplication of the protective coatings.

The metallurgical damage is inherent as a result of normal operation of the gas turbine engine. The blade material, typically a high temperature superalloy, derives its corrosion and oxidation resistance by selection of a careful combination of elements. Its strength is a result of formation of fine precipitates by precipitation hardening. However, operation of the blades at the high temperatures of the turbine engine for extended periods of time results in fatigue, creep-rupture and rafting. Rafting, when it is present, occurs in the turbine blade from the platform to the top, and more specifically, in the blade trailing edge below the tip and above the platform. As used herein, rafting means coarsening of the $\gamma'$ precipitate and precipitate alignment in the direction of applied stress. This region having the coarsened $\gamma'$ is characterized by reduced strength.

Welding of the blades to repair mechanical damage is known. The damage repaired by welding is not limited to blades removed from engine service, but can also be new blades requiring repair of casting defects or damage resulting from testing or machining. Although various weld repair methods are available, one illustrative weld repair method is SWET welding, that is, Superalloy Welding at Elevated Temperatures. This process was developed by General Electric Aircraft Engines in the 1980's to commercially repair damaged turbine blades refurbished for its airline customers. The process entails heating of the blade airfoil to an elevated temperature using a heat source such as quartz lamps or induction coils. The heat source is focused in a narrow region of the blade undergoing repair, typically at the blade tip, and heat is localized at the blade tip. An area of the blade to be repaired is then welded while maintaining the blade at elevated temperature. A variation of SWET welding techniques appears in various prior art references.

The problem with welding of blades is that the weld area and heat affected zone (the "HAZ") are heated above the solutioning temperature of the gamma prime. As the blade cools, heat is conducted away from the narrow area of weld repair and the HAZ, but $\gamma'$ will precipitate in this area. As heat is transferred away from the repair area, and in portions of the HAZ, the temperature of the metal is increased, but not to a temperature sufficient to raise the alloy above the solutioning temperature of the $\gamma'$. While fine $\gamma'$ precipitate forms in the narrow region of weld repair and a portion of the HAZ, the $\gamma'$ precipitate in narrow adjoining regions further coarsens and is characterized by further reduced strength. Thus, mechanical repair by welding does not provide a solution to the metallurgical problems related to extended use of precipitation-hardened alloys at elevated temperatures, and in certain cases, may further exacerbate the problem.

Although the prior art discloses that the weld area is desirably stress relieved and rapidly cooled to a temperature below the $\gamma'$ precipitation hardening temperature, the prior art does not address the problem of rafting in other regions of the airfoil portion of the blade that may be distal weld repair. The prior art references indicate that, in order to reduce the residual stresses in the repaired article, the weld-repaired blade (i.e. the entire blade) is placed in a fixture and stress relieved in a furnace, as is typically done on weld-repaired articles subject to stress, although the written description is otherwise devoid of a discussion of how post-weld treatments are accomplished. The prior art does not recognize the need to restore the metallurgical properties of airfoils not subject to weld repair.

A method for sintering a wear resistant layer to a blade tip is disclosed in U.S. Pat. No. 4,818,833 issued Apr. 4, 1989. This patent identifies utilizing a radiant heat source to heat the blade tip. The radiant heat source is a graphite susceptor having heating chambers which extend into the susceptor. No post-sintering heat treatments are discussed; however the patent does disclose coarsening of the gamma prime near the blade tip that was judged to be acceptable, but does not recognize the problem of continued coarsening of this gamma prime that will inevitably result from high temperature exposures for long periods of time. Of course, obvious methods of heating may be substituted for the radiant heat source, such as for example, induction coils, but such substitutions do not provide recognition of the problem of continued coarsening, or alleviation of coarsening that has already occurred.

U.S. Pat. No. 6,020,571 (the '571 patent) and U.S. Pat. No. 6,124,568 (the '568 patent), assigned to the assignee of the present invention and incorporated herein by reference in their entirety disclose acceptable methods of welding of precipitation hardenable nickel-based superalloy blades by carefully controlling heat input during the welding process. While effective for advancing the art of welding, the '568 patent only deals with the problem of $\gamma'$ precipitation resulting from the welding operation, and this problem is controlled by controlling the heat input in the localized region undergoing repair in accordance with a desired temperature profile.

In order to achieve a uniform $\gamma'$ precipitate structure throughout the blade, either as a result of post-welding coarsening or as a result of rafting due to extended exposure to high temperatures, one current practice is to solution the entire blade, thereby dissolving all $\gamma'$, followed by reprecipitation of the $\gamma'$. This process is effective in providing uniform $\gamma'$ in the airfoil portion of the blade, but presents other problems. Specifically, dovetail regions of the blade and the shank regions of the blade, both located below the platform region, are subjected to high stresses, either from machining operations or from service induced stresses as a result of being positioned in the disk at high rotational speeds, or both. These operations result in residual stresses. The portions of the blade below the platform also experience an operating temperature significantly lower than the airfoil portion of the blade, which extends into the hot gas stream. Thus, a high temperature solutioning treatment of those portions of the blade below the platform is undesirable as it can result in recrystallization of these portions due to the residual stresses. Since many modern blades are either directionally solidified (providing large columnar grains oriented parallel to the longitudinal axis of the blade) or are solidified as single crystals, recrystallization in this region is undesirable as it reduces strength of the blade in this region, which can be a limiting factor for the mechanical properties of the entire blade.

What is needed is a technique that permits restoration of metallurgical properties of the airfoil portion of a blade having $\gamma'$ precipitates to eliminate the problem of rafting. The rafting can be a result of extended use of the blade at elevated temperatures and load. The restoration of the metallurgical properties of the airfoil portion of the blade should be accomplished without adversely affecting the as-cast grain structure of the portions of the blade at or below the blade platform, such as the dovetail area of the blade.

SUMMARY OF THE INVENTION

The present invention provides apparatus and a method for heat treating a precipitation-hardened article having a thick section and a thin section so that the thin section can be solution annealed while the metallurgical structure of the thick section is substantially unaffected by the solution-annealing process. In particular, the present invention provides a method for restoring the microstructure of the thin section uniformly by solution annealing the thin section to achieve a preselected microstructure but without affecting the microstructure of the thick section. More specifically the article is superalloy turbine blade used in a gas turbine engine, the thin section is the airfoil portion, which is solution annealed and then heat treated to obtain the desired microstructure, while the thick section is the portion below the platform which is maintained at a temperature below its recrystallization temperature.

A turbine blade used in a gas turbine engine comprises an airfoil portion extending outward into the hot gas flow path of the turbine engine, a dovetail portion that attaches the turbine blade to a turbine disk and a platform portion that is intermediate the airfoil portion and the dovetail portion. A shank portion provides a transition between the platform portion and the dovetail portion, the shank portion and the dovetail portion comprising the blade below the platform portion. The airfoil portion of the turbine blade is of a thin, curvilinear design engineered to allow for smooth fluid flow of gas over the airfoil portion surface in the engine gas flow path, while maximizing the energy withdrawn from the hot gas. The gas contacting and flowing over the airfoil portion powers the turbine. A plurality of turbine blades are attached to the turbine disk. While the platform is an optional feature in a blade, the platform is oriented substantially perpendicular to the dovetail portion and the airfoil portion. The platform assists in reducing the leakage of hot corrosive, oxidative combustion gases below the platform and between the blade dovetail portion and the mating disk dovetail slots, thereby providing protection to both the disk and the blade dovetail portion from the hot corrosive/oxidative combustion gases.

The present invention accomplishes restoration of the metallurgical structure of the airfoil portion of the turbine blade to that which approximates the microstructure of a new-make blade, typically an as-cast microstructure, without disturbing the microstructure of the blade below the blade platform, thereby restoring the fatigue and creep-rupture properties to the blade, as well as other mechanical properties. The article and method of the present invention permits restoration of blades removed from service that have deteriorated mechanical properties resulting from rafting, as well as blades that have been weld repaired to restore damaged portions of the airfoil portion. The weld repair may be accomplished by any traditional weld repair method, such as SWET welding, TIG welding laser welding or any other well-known welding repair method to restore the airfoil portion of damaged new-make blades or blades removed from service. The blade undergoing metallurgical restoration, as discussed above, experiences rafting in the airfoil portion either as a result of in-service operation or as a result of weld repair, or both. In order to restore the microstructure of the blade to new-make conditions, typically an as-cast microstructure, rafting is eliminated from the airfoil portion by heating only the airfoil portion above the solutioning temperature, thereby resolutionizing it. The airfoil portion can then be precipitation-hardened to provide a preselected microstructure compatible with its intended future use.

The microstructure restoration of the present invention discussed above is accomplished by placing the turbine blade in the fixture of the present invention. The fixture comprises a high conductivity material. The fixture includes a receptacle having a geometry for receiving the portion of the blade below the blade platform, at least the dovetail portion, and typically the shank as well. The portion of the blade below the platform is placed in the receptacle of the fixture so that heat from the airfoil portion solutioning operation can be transferred away from the blade below the platform by operation of the fixture. A portion of the blade, typically including the airfoil portion of the blade, extends from the fixture. The fixture further includes a means for removing heat from the blade and fixture while preventing fixture from overheating. Typically, a cooling fluid contacts a surface of the fixture to transfer heat away from the portion of the blade below the platform. Because the solutioning temperature for each specific alloy will vary, the solutioning temperature is dependent on alloy composition as well as the size and distribution of the γ' desired for a given application, but the solutioning temperature and time are selected so as to solution γ' precipitates. To further elaborate on the variability of solutioning temperature, Rene' N5 is a well-known superalloy composition used for turbine blade applications having a range of compositions. The solutioning temperature for alloy compositions falling within the Rene' N5 range, which has a compositional range in weight percent of 5-10 percent cobalt, 5-10 percent chromium, 5-7 percent aluminum, 3-8 percent tantalum, 3-8 percent tungsten, up to 2 percent molybdenum, up to 6 percent rhenium, 0.08-0.2 percent hafnium, 0.03-0.07 percent carbon, 0.003-0.006 percent boron, up to about 0.02 percent yttrium and the balance nickel, can vary significantly. The solutioning temperature will vary as the compositional range of the alloy changes, even within the identified range limits. This is true as well for other superalloys typically manufactured within an identified compositional range. For most nickel based superalloy blades, the solutioning temperature is in the range of about 1900-2400° F. for a time of about 0.25-24 hours.

While maintaining a supply of cooling fluid across a surface of the fixture, the portion of the blade extending from the fixture is heated under a protective atmosphere. The blade can be heated by selective application of heat to a portion of the blade extending form the fixture, typically its airfoil portion, using any suitable means for heating. The airfoil portion of the blade is heated to a temperature in the solutioning temperature range of the alloy. The fixture conducts heat from the platform and the portion of the blade below the platform, so that the temperature rise is sufficiently low in the portion of the blade below the platform that neither recrystallization nor coarsening of the precipitates occurs. This temperature of the airfoil portion is maintained for a time sufficient to solution intermetallic phases present in the form of precipitates. Then, the heat source is removed. The fixture quickly transfers heat from the airfoil portion of the blade, precipitates forming in the airfoil portion as it cools. If the precipitate size is not proper, heat can be applied to the airfoil portion of the blade to permit coarsening to the proper size, as required.

The solutioning temperature is an inherent characteristic temperature of each precipitation-hardenable alloy. This solutioning temperature is readily available for all commonly used precipitation-hardenable alloys, and is readily determinable for new precipitation-hardenable alloys and uncatalogued precipitation-hardenable alloys by one skilled in the art. The solutioning temperature is an elevated temperature at which precipitates, typically a separate intermetallic phase formed at an aging temperature below the solutioning temperature, dissolve in the metal matrix yielding a uniform matrix substantially free of γ'. Material systems having more than one intermetallic phase may have more than one solutioning temperature, as intermetallic phases of different compositions dissolve at different elevated temperatures. Solutioning temperatures of nickel base superalloys are in the range 1900-2400° F. Precipitation-hardening temperatures are below the solutioning temperature and can be as low as 1400° F., but will vary depending on the alloy and the size of the precipitate. The rate of formation and growth of precipitates in a matrix is a function of time at temperature as is known in the art.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention provides a method for solutioning the airfoil portion of a turbine blade and then uniformly age hardening the airfoil portion of the turbine blade without recrystallizing the portion of the turbine blade below the platform. This restoration is required once the microstructure of the airfoil portion has been modified. This solutioning and age hardening treatment of the airfoil portion of the turbine blade restores mechanical properties uniformly to the airfoil portion of the blade, while restoring a substantially uniform microstructure. The present invention further provides apparatus in the form of a fixture for accomplishing the solutioning and subsequent age hardening of the airfoil portion of the turbine blade.

Figure 1:
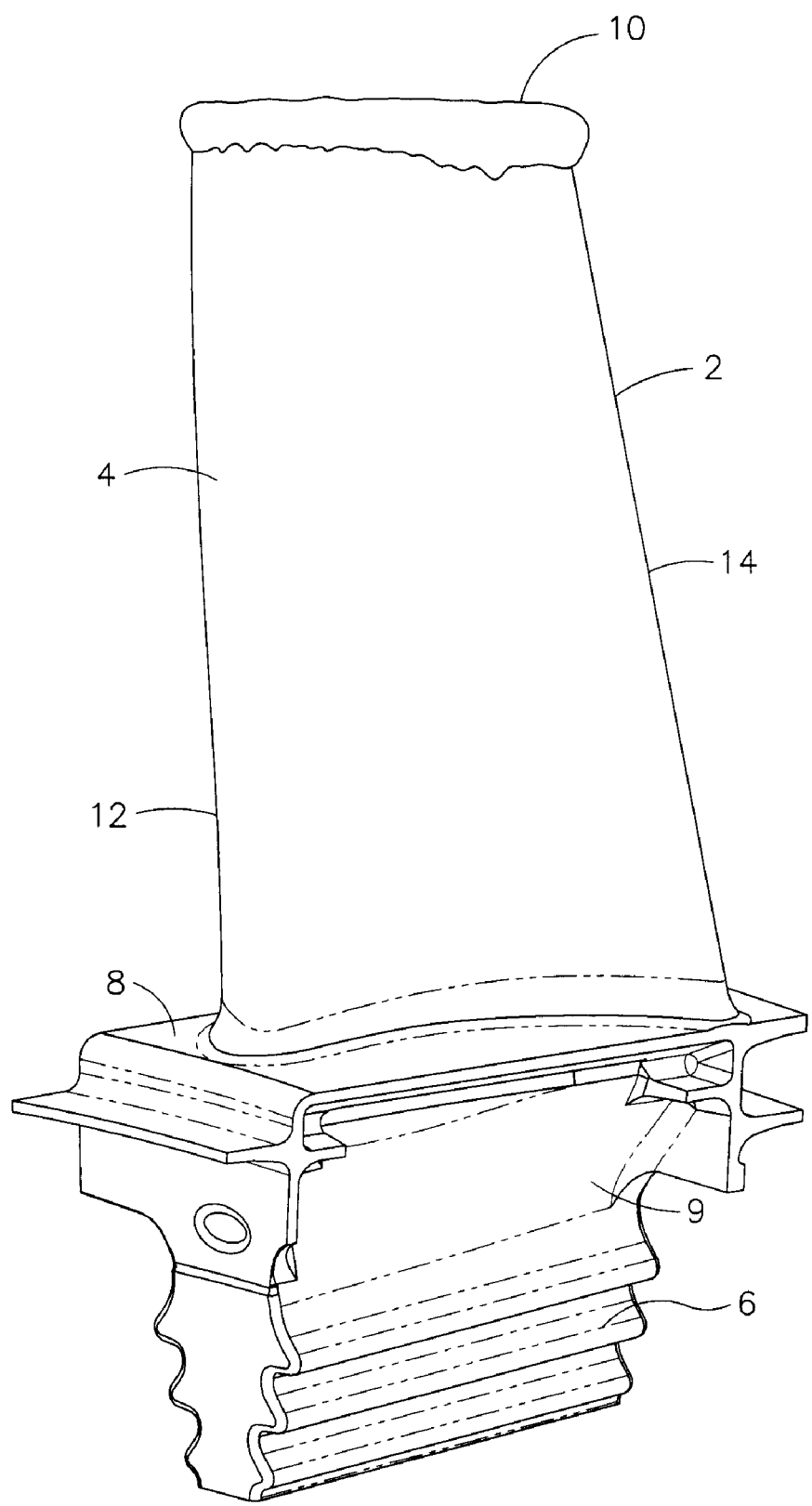
FIG. 1 depicts a perspective view of a repaired airfoil.

A typical turbine blade 2 is depicted in FIG. 1. However, the invention is not limited to a turbine blade, and may include other configurations having a thin section and a thick section wherein the microstructure of one section must be modified without significantly altering the microstructure of the other section. Another such structure within a turbine engine is a turbine vane also generically defined as a turbine airfoil, which also has a thin section extending from a thicker section. This structure is distinguished from the turbine blade in that it is substantially stationary, being a non-rotational part. However, the thin section still may require microstructure restoration. Turbine blade 2 includes an airfoil portion 4 extending from a platform portion 8. The portion of the blade extending from the platform 8 in a direction opposite the airfoil portion includes a dovetail portion 6 and a shank portion 9 intermediate the platform portion 8 and the dovetail portion 6. The airfoil portion 4 further includes a tip section 10, a leading edge 12 and a trailing edge 14. In FIG. 1, the tip region 10 has been weld repaired to restore missing metal thereby restoring the dimensions of the blade. Tip region 10 is the region most frequently repaired. However, the weld repair may occur anywhere along the airfoil portion 4, the platform portion 8 or the seal lips. Welding in the tip region is associated with rafting in the area adjacent to the weld repair. However, rafting, typically resulting from service in a turbine engine, can occur anywhere on the airfoil portion 4 above the platform 8.

Figure 2:
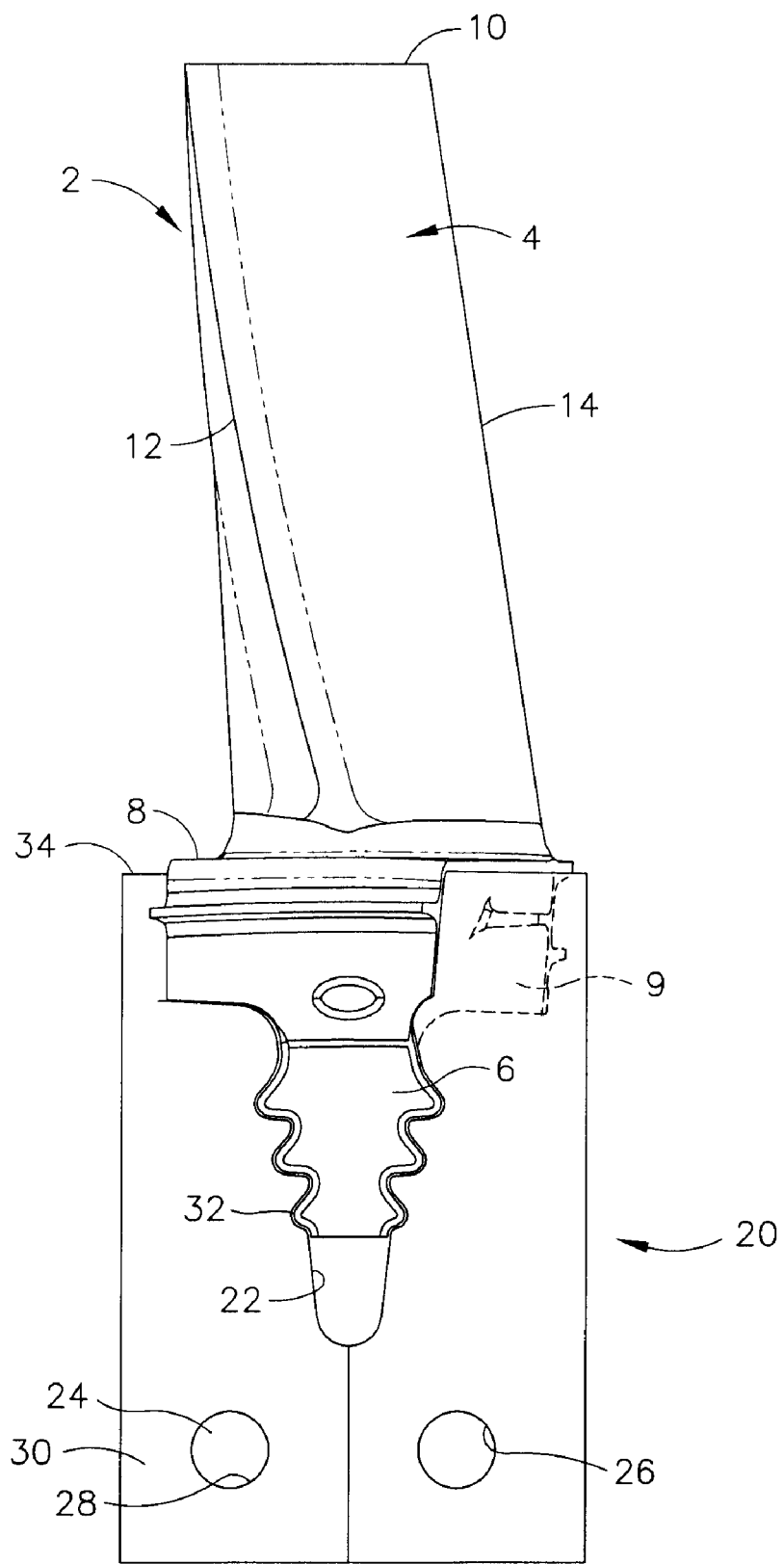
FIG. 2 depicts a front view of a repaired airfoil assembled to the fixture of the present invention.
Figure 3:
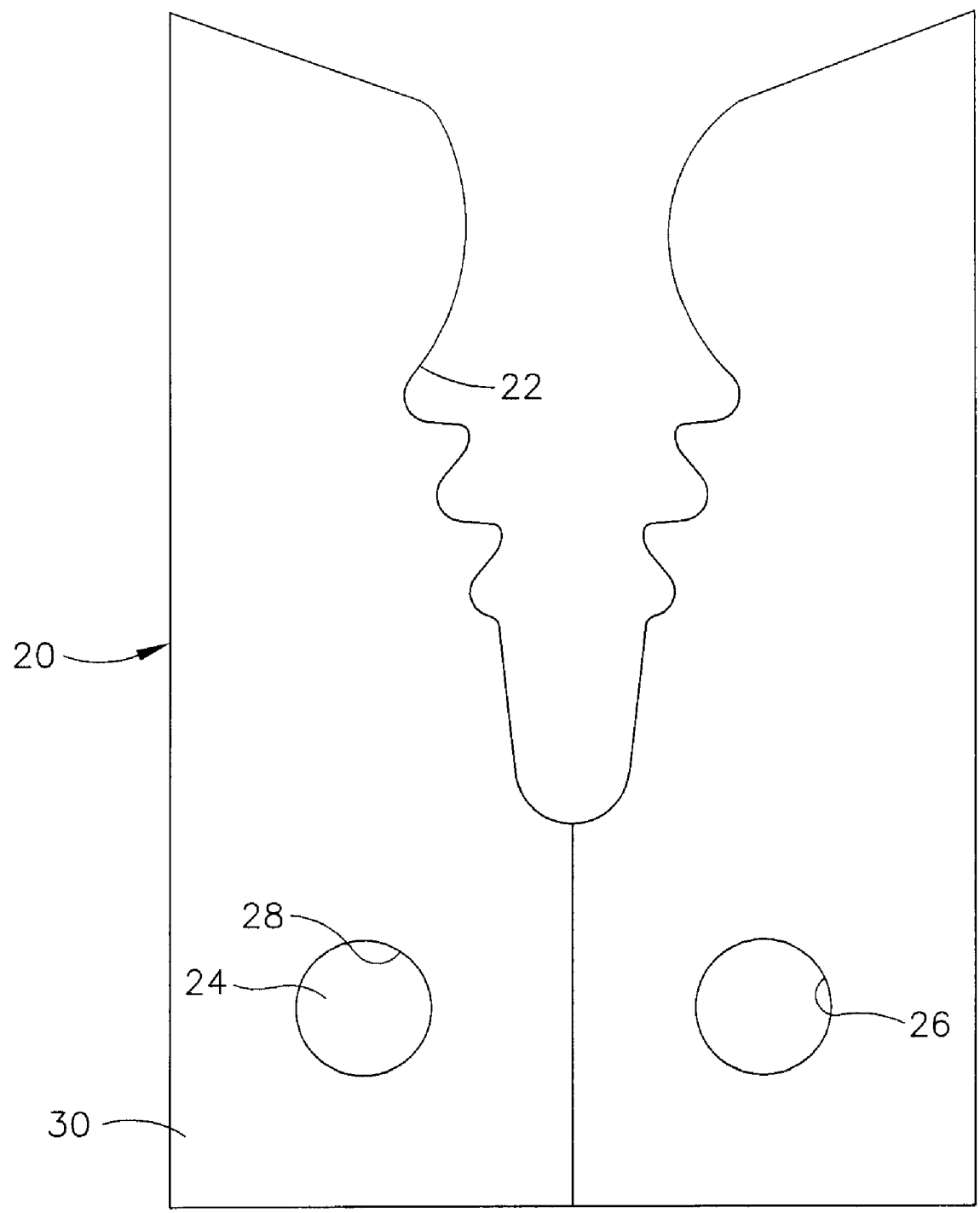
FIG. 3 depicts a front view of the fixture of the present invention used to solution heat treat airfoils in accordance with the method of the present invention.

FIG. 2 depicts turbine airfoil 2 inserted in fixture 20. FIG. 3 depicts fixture 20 without a turbine airfoil 2 inserted therein. The portion of the blade below the platform, the shank portion 9 and the dovetail portion 6, is inserted into fixture 20, which includes a dovetail slot 22 corresponding to blade dovetail portion 6. In the embodiment depicted in FIG. 2, the fixture further includes an orifice 24 extending therethrough, the orifice 24 having an inlet 26 and an outlet 28. As shown, the inlet 26 and outlet 28 are depicted as being on the same face 30 of fixture 20, but the invention is not so restricted, as the inlet 26 and the outlet 28 may be positioned at any convenient locations on fixture 20. The purpose of the inlet and the outlet are to provide a cooling means to remove heat from the fixture, so any means to remove heat from the fixture during solutioning may be utilized. In FIG. 2, a cooling fluid enters inlet 26, transits through orifice 24 extending through fixture 20, and exits through outlet 28, absorbing heat by conduction.

Figure 4:
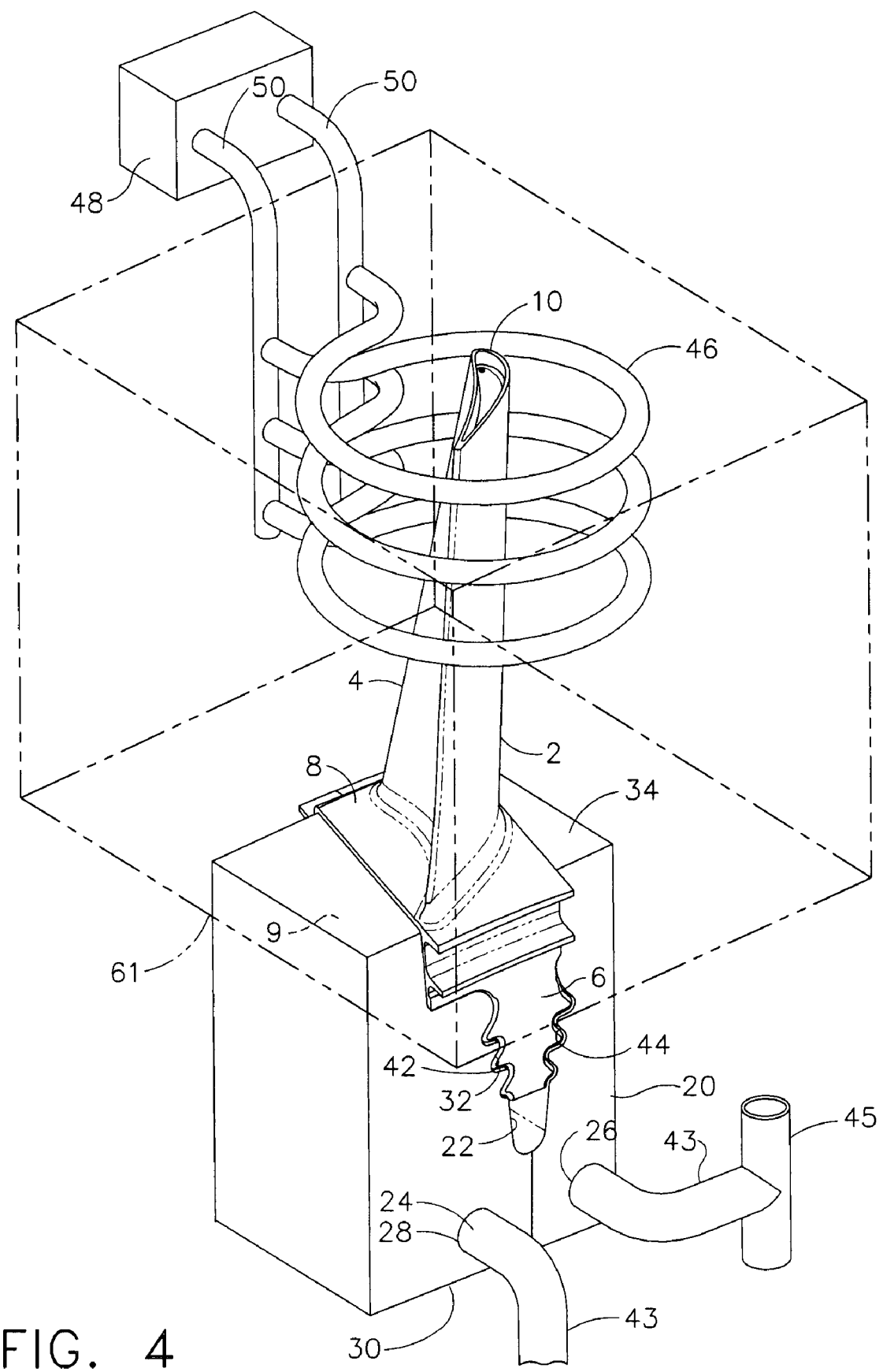
FIG. 4 depicts a perspective of an airfoil in a fixture with a heat source applied to the airfoil in accordance with the best mode of practicing the method of the present invention.

The receiving area of the fixture 42 in FIG. 4 is a surface configured to mate with a corresponding surface of a workpiece, here the portion of turbine blade 2 below the platform portion 8 that includes dovetail portion 6 and shank portion 9. The fixture may be designed so that platform portion 8 rests on the top surface 34 of fixture 20. It is intended that the amount of surface contact between these mating surfaces be maximized to facilitate the transfer of heat from the hotter surface, here the turbine blade as will be explained, to the cooler surface, the fixture. If desired, an optional conductive material 32, such as a conductive grease, can be inserted to fill any gaps between the mating surfaces, thereby increasing the heat transfer between them, as it is well known that air gaps can provide effective insulation which can inhibit conduction.

A cooling fluid passes through orifice 24. Cooling inlet 26 and cooling outlet are adapted to receive a connection to facilitate fluid flow. This may be accomplished by any convenient mechanical connection, such as a threaded connection, a slip fitting, a compression fitting, a friction fitting, an interference fitting etc. Alternatively, the connection may be somewhat more permanent, such as a soldered connection to a line from the fluid source. While the connection should provide a fluid-tight connection to prevent leakage of fluid at the connection, the connection is not a primary aspect of the invention.

Fixture 20 is comprised of a highly conductive material that, when properly cooled, has a temperature capability consistent with the solutioning temperature of the article, here turbine blade 2. As turbine blades typically are nickel-based superalloys with solutioning temperatures in the range of about 1900-2400° F., fixture 20 is preferably copper. While cooling fluids that can be supplied to orifice 24 may include gases or liquids, water is the preferred cooling fluid. However gases, such as nitrogen, or inert gases or other suitable liquids including water solutions may be substituted for water.

Once the repair of the article is accomplished, here the airfoil portion 4 of a turbine blade, the blade is placed in fixture 20 so that conductive contact is established between the article and the fixture. Referring again to FIG. 4, this typically is accomplished by fabricating the receiving area 42 of fixture 20 to mate or interface with the adjacent surface 44 of the article, here the portion of the blade below the platform that includes the shank portion 9 and blade dovetail portion 6, so that the article 2 is supported when inserted in the fixture 20, while leaving the area requiring solutioned, here airfoil portion 4, exposed. Importantly, the adjacent surface 44 of the article, here the portion of the blade below platform portion 8 that includes the shank portion 9 and dovetail portion 6, and the receiving area 42 of the fixture are in intimate contact to facilitate transfer of heat across the interface. If required to improve conductivity between the article and fixture 20, a conductive grease 32 can be applied to fill any voids between the receiving area 42 of fixture 20 and mating surface 44 of the article, thereby improving heat transfer between the article and the fixture.

As will be recognized by those skilled in the art, fixture 20 provides substantial support for an article such as a turbine blade 2, so that any weld repairs to airfoil portion 4 can be accomplished with the turbine blade 2 inserted into fixture 20 if desired.

Once the article, turbine blade 2 is assembled into fixture 20, fluid conduits 43 are established at fixture inlet 26 and outlet 28, and cooling fluid flow is established from a fluid source 45 through fluid connections 43 and through orifice 24, a protective atmosphere is provided around the area being heated. The protective atmosphere can be a reducing gas such as nitrogen, an inert gas such as argon, or even a purged vacuum if at least the area to be solutioned is placed into a protective atmosphere that is purged by application of the vacuum. In FIG. 4, the assembly is placed in an enclosure 61, which is then provided with a protective atmosphere. The enclosure may take any form 61. However, no enclosure is required, and the protective atmosphere may be provided by maintaining a positive pressure of the protective gas over the area being solutioned. In a preferred embodiment, the heat can be applied selectively to the area requiring solutioning, here airfoil portion 4, which is heated to the solutioning temperature of the material. As noted previously, the solutioning temperature is an inherent property of the precipitation hardenable material being solutioned and is determined by its composition. Turbine blades and vanes typically are nickel-based superalloys having a solutioning temperature in the range of 1900-2400° F. Heat is applied to the thin area, the airfoil portion 4, by any convenient means to raise the temperature of this area to the solutioning temperature, but below the melting temperature of the material. The preferred method of applying heat to the repaired area is by use of an induction coil 46. FIG. 4 depicts three induction coils 46 connected to a power supply 48 via an electrical cable 50 so as to provide uniform heating of the airfoil portion. In FIG. 4, an appropriate seal may be provided to seal the enclosure where the cable 50 runs through it, but this is not a critical aspect of the invention, such sealing arrangements being well known to the art. Heat can be applied to the repaired area by any other means, such as by the radiant energy produced by quartz lamps (i.e. radiant light) focused on the portion of the blade extending from the fixture, by use of a susceptor, by inserting the article and fixture into a furnace etc. Again, the method of heating is not an important aspect of the invention, as methods of uniformly heating a surface while maintaining a protective atmosphere are well-known to the art.

As the thin section is solutioned by heating, here the airfoil portion 4 of turbine blade 2, heat is transferred through the thick section of the article, here the portion of the turbine blade below the platform portion 8, to fixture 20. The flow of cooling fluid, in the preferred embodiment water, through orifice 24 in the copper fixture, as preferred, transfers heat away from the copper fixture thereby preventing it from overheating. Even though the airfoil portion 4 is evenly heated to an elevated temperature so that it is solutioned, the transfer of heat through the fixture and to the cooling fluid is sufficient to keep the remainder of the blade at a temperature sufficiently low so that microstructural changes do not occur. Specifically, recrystallization in the worked portions of the blade below the platform portion 8 is to be avoided. Thus, even though the airfoil portion is solutioned, the shank portion 9 and the dovetail portion 6 remains relatively cool and the microstructure in these portions remains substantially unchanged by the processing, while rafting is eliminated in the airfoil portion 4, which is solutioned. After the solutioning operation is complete, the source of heat 46 is removed, allowing the solutioned area to cool quickly. The rate at which the repaired area is cooled can be controlled by controlling or stopping the flow of cooling fluid. Rapid cooling should prevent coarse precipitates from forming. If the microstructure of the article is not as desired after cooling, the entire article can be heated to a preselected aging temperature for a preselected time to provide the desired microstructure, provided that the aging temperature is below the recrystallization temperature of the thick portions of the article, here the shank portion 9 and the dovetail portion 6. This aging temperature will form $\gamma'$ precipitates of the desired size in the airfoil portion, but the temperature is sufficiently low that the microstructure of the dovetail is not affected. Alternatively, the dovetail portion can be cooled in the fixture as described above, while the portion of the blade extending from the fixture is aged for a preselected period of time at a preselected temperature to achieve the desired precipitate size, as described above. Of course, the aging temperature is maintained well below the solutioning temperature Again, as is recognized by those skilled in the art, this temperature/time to achieve a desired microstructure size is an inherent characteristic of the material.

After the thin section of the article has been aged to achieve the desired microstructure, it is suitable to be placed into service. Any rafting that may have been present in the thin section, here airfoil portion 4, is removed by the solutioning and homogenization of the thin portion. Subsequent development of the precipitates by age hardening restores the mechanical properties, and in particular creep-rupture and fatigue properties, to the blade, so that it can be returned to service having mechanical properties equivalent to a new blade.

Figure 5:
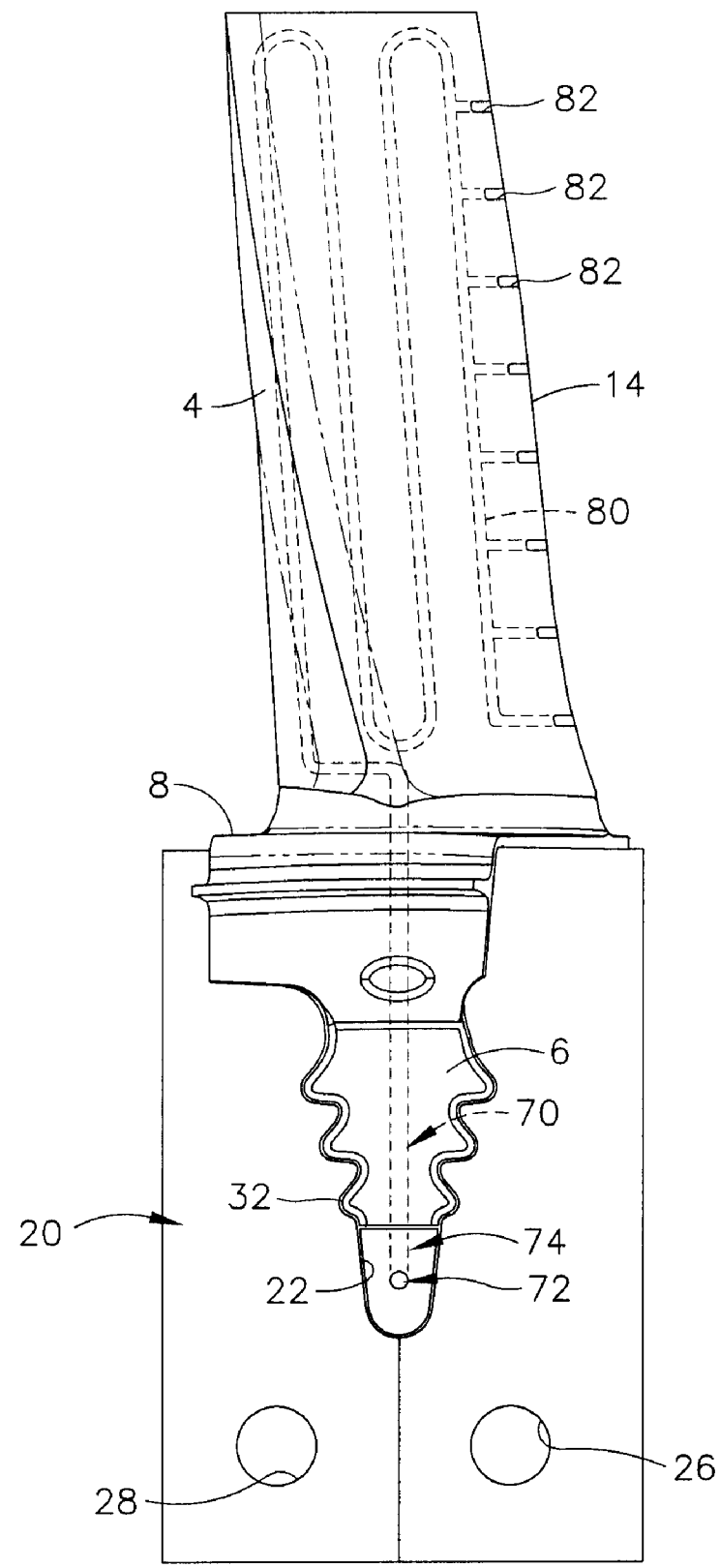
FIG. 5 depicts a front view of a repaired airfoil assembled to a second embodiment of the fixture of the present invention having capabilities of cooling the internal cavity of the airfoil.

FIG. 5 depicts an alternate embodiment of the present invention. Because turbine blades, particularly high pressure turbine blades, operate at very high temperatures, both passive and active cooling methods are utilized to prevent overheating. Passive cooling methods include thermal barrier coating systems. Active cooling is provided by providing the turbine blades with internal cavities or internal cooling passages. These cooling passages are also referred to as serpentine passages and are well known in the art. Cooling air from the compressor is passed through these serpentine passages to help to maintain the temperature of the blade within temperature limitations. In order to protect the walls of these internal cooling passages from corrosion and oxidation at the elevated temperatures of operation, these walls are provided with a protective coating. While the protective coating may be any protective coating compatible with the airfoil alloy, one well-suited for nickel-based superalloy turbine blades is an aluminide coating, which is applied by circulating a vapor phase aluminide through the passage ways, the aluminide being deposited on the walls of the passageways. The cooling air circulated through the serpentine passageways of the blade also avoids incipient melting of the thin aluminide coating applied over the nickel-based superalloy substrate of the internal passageways.

One of the problems faced by blades with internal serpentine passageways having walls protected by aluminide coatings is that the high temperatures of solutioning can cause the incipient melting of the thin aluminide coating, thereby destroying the protective coating on the serpentine walls and making the internal walls susceptible to oxidation and perhaps corrosion at elevated operating temperatures. However, as shown in FIG. 5, which is a modification of the fixture disclosed in FIGS. 2, 3 and 4, this problem is solved by utilizing the serpentine passageways during solutioning. FIG. 5 depicts a blade having at least one internal passageway 70. As shown, the at least one internal passageway 70 extends through the portion of the blade below platform portion 8, that is the dovetail portion 6 and the shank portion 9. The at least one internal passageway 70 connects to serpentine passageway 80 in airfoil portion 4. In this embodiment, a cooling gas is provided and flows through a gas attachment 72 positioned in fixture 20. A cooling gas, typically an inert gas such as argon is provided to gas attachment 72. Gas attachment is in fluid communication with gas vent 74 which, in turn is in fluid communication with the at least one internal passageway 70. Appropriate sealing arrangements can be provided between blade dovetail portion 6 and gas vent 74 so that a positive flow of gas is channeled into the at least one internal passageway 70. Alternatively, fixture 20 can be designed with a movable closure along its vertical walls so that the blade below the platform portion 8 is sealed in fixture 20 after installation, and gas supplied to the fixture 20 through gas attachment 72 and gas vent 74 or through a separate gas supply means enters into the at least one internal passage 70. The gas flowing through the at least one internal passage enters into the serpentine passageways 80 of airfoil portion 4 and exits the airfoil portion 4 through apertures 82 located along the trailing edge 14.

The flow of cooling gas through the at least one internal passage 70, into serpentine passageways 80 and out the apertures 82 located along the trailing edge 14 provide cooling to the both the at least one internal passageway 70 and serpentine passageways 80 during the solutioning operation, thereby keeping the aluminide coating below its incipient melting temperature. The incipient melting temperature of any aluminide coating/nickel-based superalloy combination will vary depending upon the composition of the nickel-based superalloy. Incipient melting of an aluminide coating applied to a nickel-based superalloy can generally be avoided by maintaining the temperature within the cooling passages below about 2100° F. However, it will be recognized by those skilled in the art that in certain nickel-based superalloy/aluminide coating combinations, incipient melting is not a problem until higher temperatures. For example, aluminide coatings in Rene 142 and Rene N5, two well-known turbine superalloys, incipient melting will be avoided if the temperature within the cooling passageways is maintained below about 2200° F. Thus, restoration of the microstructure of turbine blades with internal cooling passageways or serpentine channels can be accomplished without damaging the aluminide coating applied to the blade internal walls by avoiding incipient melting of the applied coating using a slight modification of the fixture of the present invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for using a fixture to differentially heat treat a superalloy turbine blade, comprising the steps of:
   providing a turbine blade having an airfoil portion, a platform portion, a shank portion below the platform portion and a dovetail portion below the shank portion;
   providing a source of cooling fluid;
   providing a fixture for supporting the turbine blade, the fixture further comprising
      a material of high conductivity,
      a receptacle corresponding to at least a part of a blade surface below the platform portion of the turbine blade, the receptacle providing surface contact with at least the part of the blade surface below the platform surface when inserted therein so that at least the airfoil portion of the blade projects away from the fixture,
      an orifice having an inlet and an outlet, the inlet connected to the source of the cooling fluid;
   inserting at least a part of the blade surface below the platform portion into the receptacle of the fixture;
   establishing a flow of cooling fluid from the source of cooling fluid through the orifice;
   providing a heating source;
   utilizing the heating source to heat the airfoil portion of the blade projecting away from the fixture; and
   heating the airfoil portion of the blade to a solutioning temperature of the superalloy for a time sufficient to solution gamma prime precipitates, while maintaining at least the part of the blade below the platform in the receptacle of the fixture below the solutioning temperature, the fixture conducting heat away from the blade, and the cooling fluid conducting heat away from the fixture;
   wherein the step of providing a turbine blade further includes providing a turbine blade having internal cooling passageways, the step of providing a fixture further includes providing a fixture having a means for providing cooling fluid to the internal cooling passageways of the turbine blade, and the step of establishing a flow of cooling fluid further includes establishing a sufficient flow of cooling fluid through the means for providing cooling fluid to the internal cooling passageways so that the temperature of the internal passageways is maintained below an incipient melting temperature of an aluminide coating applied to the internal passageways of the superalloy turbine blade substrate.

2. The method of claim 1 further including the additional steps of:
   after solutioning, heating the blade to an aging temperature below the solutioning temperature, the aging temperature and time selected to produce a uniform distribution of $\gamma'$ precipitates of a preselected size characteristic of the alloy in the solutioned portion of the blade, while not substantially affecting the size and distribution of $\gamma'$ in the portion of the blade below the platform.

3. The method of claim 1 further including the additional step of providing a protective atmosphere over at least the airfoil portion of the blade during the step of heating to a solutioning temperature.

4. The method of claim 1 wherein the additional step of providing a protective atmosphere includes providing a protective atmosphere selected from the group consisting of an inert gas and a reducing gas.

5. The method of claim 1 further including the step of applying a high temperature conductive grease between the receptacle and the part of the blade below the platform portion in the receptacle, thereby increasing conductivity between the blade and the fixture.

6. The method of claim 1 wherein the step of providing a source of cooling fluid includes providing water.

7. The method of claim 1 wherein the step of heating at least the airfoil portion of the blade to a solutioning temperature of the superalloy for a time sufficient to solution $\gamma'$ precipitates includes heating to a temperature in the range of from about 1900°-2400° F. for a time of about 0.25-24 hours.

8. The method of claim 1 wherein the step of providing a fixture comprising a material of high conductivity includes providing a fixture selected from the group consisting of copper and its alloys.

9. The method of claim 1 wherein the steps of providing a heating source and utilizing the heating source to heat the portion of the blade projecting away from the fixture includes providing quartz lamps and focusing the quartz lamps on the portion of the blade projecting away from the fixture.

10. The method of claim 1 wherein the steps of providing a heating source and utilizing the heating source to heat the portion of the blade projecting away from the fixture includes providing an induction coil and placing the induction coil around the portion of the blade projection away from the fixture.

11. The method of claim 1 wherein the step of establishing a flow of cooling fluid further includes providing a sufficient flow of cooling fluid to maintain the temperature of the internal passageways below about 2100° F.

12. The method of claim 1 wherein the step of providing a superalloy turbine blade includes providing a nickel-based superalloy turbine blade selected from the group consisting of Rene 142 and Rene N5, and wherein the step of establishing a flow of cooling fluid further includes providing a sufficient flow of cooling fluid to maintain the temperature of the internal passageways below about 2200° F.

* * * * *